(12) United States Patent
Spencer et al.

(10) Patent No.: US 6,188,349 B1
(45) Date of Patent: Feb. 13, 2001

(54) FREQUENCY ADJUSTING ARRANGEMENT

(75) Inventors: George R. Spencer, Needham; James Williamson, Franklin, both of MA (US)

(73) Assignee: Raytheon Company, Lexington, MA (US)

(*) Notice: Under 35 U.S.C. 154(b), the term of this patent shall be extended for 0 days.

(21) Appl. No.: 05/879,641

(22) Filed: Feb. 16, 1978

(51) Int. Cl.$^7$ .............................. G01S 13/72; G01S 7/285
(52) U.S. Cl. ............................. 342/62; 342/89; 342/92; 342/100
(58) Field of Search .................. 343/5 R, 5 AF, 343/17.2 PC; 325/419, 420, 421, 346; 331/11; 342/62, 73, 89, 90, 92, 93, 98, 99, 100

(56) References Cited

U.S. PATENT DOCUMENTS

| | | | |
|---|---|---|---|
| 3,909,735 | * 9/1975 | Anderson et al. | 325/419 |
| 3,979,748 | * 9/1976 | Gelleknik | 343/17.2 PC |
| 4,021,801 | * 5/1977 | Chernick | 342/89 |
| 4,048,566 | * 9/1977 | Carson et al. | 325/419 |
| 4,194,204 | * 3/1980 | Alpers | 342/80 |
| 4,788,547 | * 11/1988 | Jones et al. | 342/100 |
| 5,233,351 | * 8/1993 | Gregory et al. | 342/100 |
| 5,345,539 | * 9/1994 | Webb | 706/24 |
| 5,943,661 | * 8/1999 | Katz | 706/16 |
| 5,949,367 | * 9/1999 | Trompf et al. | 342/90 |
| 6,116,536 | * 9/2000 | Williamson | 244/3.14 |

* cited by examiner

*Primary Examiner*—John B. Sotomayor
(74) *Attorney, Agent, or Firm*—Daly, Crowley & Mofford, LLP

(57) ABSTRACT

A frequency adjusting arrangement is disclosed whereby the frequency of a local oscillator, incorporating an Yttrium-Iron-Garnet filter as the frequency determining element, is controlled to follow a coded waveform having a bandwidth wider than the bandwidth of the circuit in which such filter is used.

2 Claims, 2 Drawing Sheets

FREQUENCY ADJUSTING ARRANGEMENT

BACKGROUND OF THE INVENTION

This invention pertains generally to semiactive guidance control systems for guided missiles and particularly to a system of such kind in which the operating frequency of a reference oscillator in a guided missile during flight is controlled to maintain coherence between such operating frequency and the frequency of a control radar.

It is known in the art, as shown in the now pending U.S. patent application, Ser. No. 579,281, entitled "Adaptive Semiactive Missile Guidance System and Elements Therefore", and assigned to the same assignee as this application, that an electronically tunable arrangement may be used in a guided missile to maintain coherence between the operating frequency of a reference oscillator in such missile during flight and the frequency of a control radar. As described in detail in that application, the electronically tunable arrangement includes anYttrium-Iron-Garnet (or YIG) filter as the frequency determining element for the reference oscillator. Briefly, in such an arrangement, portions of the output signal from a voltage-controlled oscillator (the first local oscillator) are passed through a YIG filter and a passive phase shifter to the input terminals of a phase detector. The signal out of such detector, then, is indicative of the difference between the frequency of the output signal of the voltage controlled oscillator (the first local oscillator signal) and the resonant frequency of the YIG filter. The signal out of the phase detector then, after appropriate shaping, is applied to the voltage controlled oscillator to force the frequency of the output signal from that element into coincidence with the resonant frequency of the YIG filter.

In the system contemplated in the referenced patent, tuning of the voltage controlled oscillator to the proper frequency with respect to the frequency of the radar signal from the control radar is effected after the guided missile is launched by changing the resonant frequency of the YIG filter in a programmed manner until an output signal is produced by the rear receiver. When, as in the system contemplated in the referenced patent, the control radar is either a continuous wave or a pulse radar, the requisite changes in the resonant frequency of the YIG filter may be effected by appropriately controlling the current through a tuning coil in such a filter. That is to say, when the frequency of the radar signal of a control radar is substantially constant, the strength of the magnetic field in a YIG filter may be satisfactorily adjusted by controlling the current through the tuning coil in such a filter.

A different situation may obtain, however, when coding of the radar signal of the control radar is changed. For example, when the control radar is mounted on a ship, it may be desirable to transmit closely spaced frequency modulated pulses, commonly called "chirp" pulses. With such coding it is necessary to change the resonant frequency of the YIG filter by a substantial amount, say in the order of 2 MHz. Obviously, if either the pulse length or the interval between successive pulses is, relatively, very short, the current through the tuning coil must be changed relatively rapidly. Unfortunately, in such a situation the inductance of the tuning coil and unavoidable losses in the core of any known YIG filter militates against the attainment of any relatively rapid change in current with a current source of reasonable size.

It is theoretically possible to redesign any known YIG filter to allow the resonant frequency of such a device to be changed more quickly. Thus, if an ancillary tuning coil with an air core were to be added, the inductance and core losses of such coil would be far less than the inductance and core losses of the primary tuning coil in the filter. Practical considerations, however, rule out the addition of an ancillary tuning coil. In particular, if an ancillary tuning coil were to be added, the resulting filter would be extremely expensive, would be of questionable reliability and would be susceptible to microphonics.

SUMMARY OF THE INVENTION

With the foregoing in mind, it is a primary object of this invention to provide an improved arrangement for tuning a local oscillator incorporating a YIG filter in the rear receiver of a guided missile used in a semiactive guidance system.

Another object of this invention is to attain an improved arrangement for tuning a local oscillator as before, which arrangement is effective without physically changing the YIG filter when the coding of the radar signal of a control radar is changed.

The foregoing and other objects of this invention are generally attained by providing, in addition to a phase-locked loop wherein a YIG filter is incorporated as the frequency determining element for a voltage controlled oscillator when the frequency of such oscillator is to be maintained at a substantially constant frequency, a second frequency determining wideband circuit selectively operable when the frequency of such oscillator must be changed through a wide band of frequencies.

Brief DESCRIPTION OF THE DRAWINGS

For a more complete understanding of this invention, reference is now made to the following description of the accompanying drawings, wherein:

FIG. 1A is a sketch illustrating the coding of the radar signal from the control radar on the naval vessel.

DESCRIPTION OF THE PREFFERED EMBODIMENT

Figure 1:
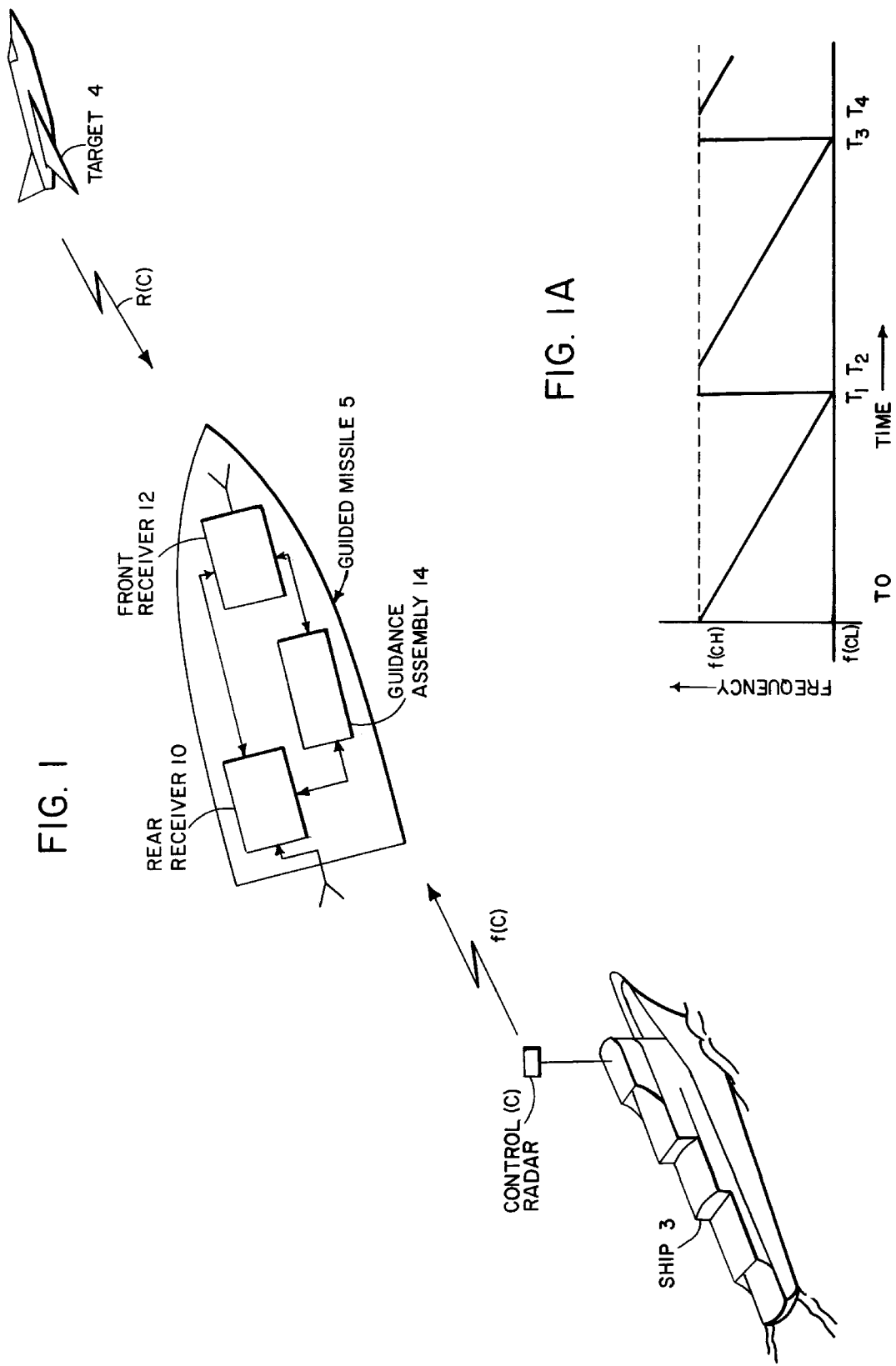
FIG. 1 is a sketch showing an exemplary tactical system wherein a guided missile has been launched from a naval vessel toward a selected target.

Before referring to the drawings in detail, it should be noted that the present invention is intended to be added to the rear receiver and first local oscillator control circuitry shown and described in the copending application entitled "Adaptive Semiactive Missile Guidance System and Elements Therefore " referred to hereinbefore. For the sake of brevity, then, the portions of that application which are necessary to an understanding of this invention are here shown in less detail than in the referenced application, it being understood that signal processing to derive the logical signals for acquiring and tracking the radar signal from the control radar and the echo signal from the selected target are here (except as noted) the same as described in the referenced application.

With the foregoing in mind, reference is now made to FIG. 1 where a ship 3 supports a control radar (C) for a semiactive guidance system. Such radar is shown simultaneously to illuminate a target 4 and a guided missile 5 in flight. Such missile carries a rear receiver 10, a front receiver 12 and a guidance assembly 14. The radar signal f(C) from the control radar (C) is received through an antenna (not numbered) directly by the rear receiver 10. An echo signal R(C) from the target 4 is received, through an antenna (not numbered), by the front receiver 12. When the front and rear receivers 12, 10 are properly tuned the echo signal, after processing in the front receiver 12, provides the proper input signals to the guidance assembly 14. The latter assembly in turn provides guidance command signals to the control surfaces (not shown) of the guided missile (5).

Referring now to FIG. 1A, the coding of the radar signal from the control radar (C) is shown to be a train of pulses, with each pulse frequency-modulated in a linear manner. In a typical case, the carrier frequency of the radar signal is in the X-band, the deviation is in the order of 2 MHz and the interval between successive pulses is approximately 120 microseconds. Under such conditions, the frequency control arrangement of the referenced application by itself is unsatisfactory because the resonant frequency of the YIG filter cannot be changed rapidly enough.

Figure 2:
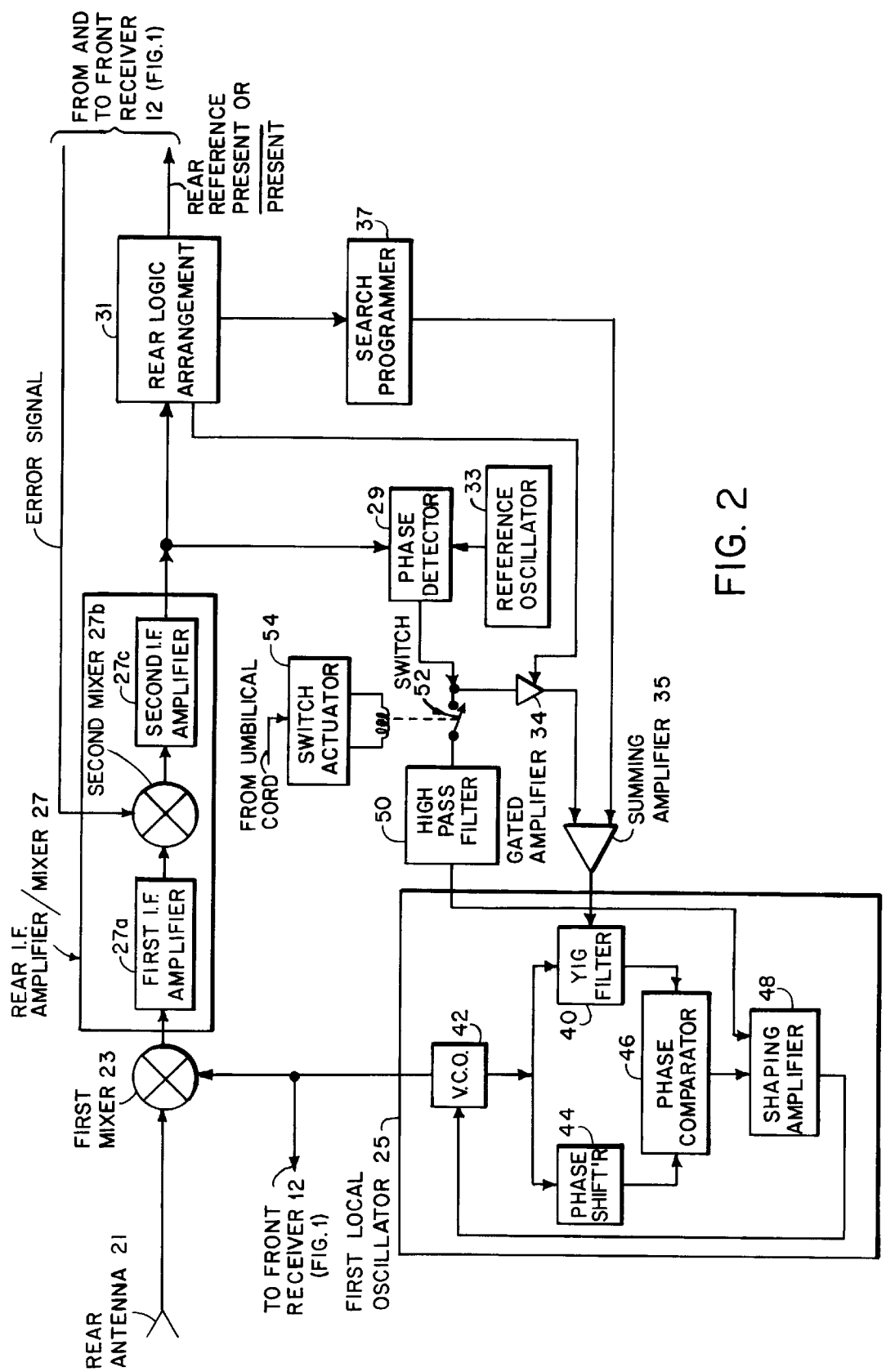
FIG. 2 is a block diagram, somewhat simplified, showing how the frequency of a voltage controlled oscillator in the first local oscillator in the rear receiver of the guided missile may be controlled to acquire and to track the radar signal coded as shown in FIG. 1A.

Referring now to FIG. 2 it will be observed that the greater part of the illustrated arrangement is the same as the rear receiver shown in the referenced application. Thus, a rear antenna 21 is shown to be connected to a first mixer 23 along with a first local oscillator signal from a first local oscillator 25.

The resulting intermediate frequency (I.F.) signal is passed through a rear I.F. amplifier/mixer 27 (which includes a first I.F. amplifier section 27a, a second mixer 27b and a second amplifier section 27c) to a phase detector 29 and to a rear logic arrangement 31. The second input to the second mixer 27b is a signal from the front receiver 12 (FIG. 1) indicative of the tuning error of that receiver. The second input to the phase 20 detector 29 is taken from a reference oscillator 33. As described in the referenced application, the rear logic arrangement 31 is responsive to the output of the I.F. amplifier 27 to provide signals indicative of whether or not a properly coded signal is being received by the rear antenna 21 and to command operation accordingly. Thus, if a properly coded signal is present, the rear logic arrangement 31 is operative to gate on a gated amplifier 34 to allow the output signal from the phase detector 29 to be passed (via a sample and hold circuit, not shown) through a summing amplifier 35. The rear logic arrangement 31 is then also operative to pass a signal indicating that a properly coded signal is being received to the front receiver 12 (FIG. 1). Alternatively, if no properly coded signal is at the output of the I.F. amplifier 27, the rear logic arrangement is operative to actuate a search programmer 37 which provides, in a programmed manner, different levels of voltage to the summing amplifier 35.

The output of the summing amplifier 35 is applied (via a driver circuit, not shown) as a tuning signal to a YIG filter 40 incorporated as a tuning element in the first local oscillator 25. The latter, as indicated, consists of (in addition to the YIG filter 40) a voltage controlled oscillator (V.C.O. 42), a phase shifter 44, a phase comparator 46 and a shaping amplifier 48. The output of the V.C.O. 42 is the first local oscillator signal applied to the first mixer 23 and to the front receiver 12 (FIG. 1).

It will now be apparent that if the frequency of the radar signal finally detected by the phase detector 29 were substantially constant (whether such signal were a pulse or a continuous wave signal) the resonant frequency of the YIG filter 40 would ultimately be forced to the frequency required for heterodyning of the first local oscillator 25 and the radar signal. That is to say, if a narrow band radar signal is detected, the response time of the YIG filter 40 (which is a wide band device) is sufficiently long for satisfactory operation. When, however, a radar signal coded in the manner shown in FIG. 1A is to be detected, the now relatively short response time of the YIG filter 40 prevents proper operation of the hitherto described circuitry. To put it another way, when a frequency modulated radar signal is to be detected, (if proper detection is to be attained by the hitherto described circuitry), the frequency response of the YIG filter 40 must be adequate.

To allow proper detection of a frequency modulated radar signal to which the YIG filter 40 cannot respond, a high pass filter 50 Is connected, via a switch 52, between the phase detector 29 and an inverting input of the shaping amplifier 48. The switch 52, in turn, is actuated by a switch actuator 54 which responds to what may be referred to as a "wideband or narrow-band control" signal over the umbilical cord. That is, when the radar signal to be detected is a frequency modulated signal to which the YIG filter 40 cannot respond, the switch actuator 54 causes the switch 52 to be closed; conversely, when the YIG filter 40 is capable of responding to a radar signal, the switch actuator 54 causes the switch 52 to be open.

With a radar signal coded as in FIG. 1A, the switch 52 is closed and the filtered output of the phase detector 29 is passed to the shaping amplifier 48. The bandwidth of the latter amplifier is relatively high (say in the order of 1 MHz) so the filtered output of the phase detector 29 is passed therethrough without any appreciable distortion to the V.C.O. 42 to change the output frequency thereof in accordance with the filtered output of the phase detector 29. Such changed output frequency is applied to both the YIG filter 40 and the phase shifter 44. The phase shift of the changed output signal in passing through the YIG filter is proportional to the difference between the frequencies of the changed output signal and the resonant frequency of the YIG filter 40. The phase shift of the changed output signal in passing through the phase shifter 44 is invariant. It follows, therefore, that the output of the phase comparator 46 is indicative of the difference between the instantaneous frequency of the changed output signal and the resonant frequency of the YIG filter 40. When the output of the phase comparator 46 is applied to a noninverting input of the shaping amplifier 48, the output frequency of the V.C.O. 42 is further changed until the filtered output of the phase detector 29 finally goes to zero. When this occurs, the frequency of the first local oscillator 25, i.e. the frequency of the V.C.O. 42, is tracking the frequency of the radar signal.

Having described the preferred embodiment of this invention, it will now be apparent to one of skill in the art that many changes may be made without departing from the inventive concepts. For example, although the missile 5 is shown in FIG. 1 to be attacking an aircraft, the target could just as well be a surface target, as a ship. Further, the descending chirp waveform shown in FIG. 1A could just as well be an ascending chirp waveform. It is felt, therefore, that this invention should not be restricted to its disclosed embodiment, but rather should be limited only by the spirit and scope of the appended claims.

What is claimed is:

1. In a radar receiver wherein a voltage controlled oscillator is used to produce a local oscillator signal to be heterodyned with a radar signal to form an intermediate frequency signal for detection in a phase detector, such detector producing a first alternating signal having a frequency indicative of the difference between the actual frequency of the voltage controlled oscillator and the frequency of such oscillator required to produce the intermediate frequency signal, the improvement comprising:

(a) a high pass filter, responsive to the alternating signal from the phase detector, for isolating such signal;

(b) means, responsive to the local oscillator signal out of the voltage controlled oscillator, for producing a second alternating signal indicative of the difference between the actual frequency out of the voltage controlled oscillator and a reference frequency; and (c) means, responsive to the first and second alternating signals, for changing the frequency of the voltage controlled oscillator to null the first alternating signal.

2. The improvement as in claim 1 wherein the first-named means includes an Yttrium-Iron-Garnet filter tuned to a frequency offset from the center frequency of the radar signal by an amount equal to the intermediate frequency.

* * * * *